Patented Oct. 20, 1953

2,656,393

UNITED STATES PATENT OFFICE 2,656,393

REACTION PRODUCTS OF HYDROGEN SULFIDE AND SALTS OF ACI-NITRO-HYDROCARBONS

Clarence S. Coe, Rolling Hills, and Thomas F. Doumani, Los Angeles, Calif., assignors to Union Oil Company of California, Los Angeles, Calif., a corporation of California No Drawing. Application February 19, 1952, Serial No. 272,526

8 Claims. (Cl. 260—608)

This invention relates to new chemical products and methods for preparing the same, and in particular concerns useful products obtained by reaction between hydrogen sulfide and certain salts of aci-nitro-hydrocarbons.

It is known that mono-nitro-hydrocarbons in which the nitro group is attached to a secondary carbon atom exist in either of two tautomeric forms which are in equilibrium with one another in accordance with the equation:

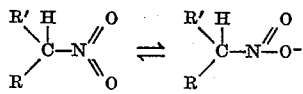

wherein R and R' each represents an alkyl radical or R and R' together represent a cyclic polymethylene chain. The form represented on the right-hand side of the above equation is known as the "aci" form, and is capable of undergoing chemical reactions characteristic of monovalent negative radicals. Thus, it can form salts with positive ions and radicals, and such salts as sodium nitro-cyclo-hexane, ammonium 2-nitropentane, etc. are known to exist as chemical entities.

The present invention is based on our discovery that the monovalent salts of aci-nitro-hydrocarbons undergo reaction with hydrogen sulfide to form new chemical products which are useful as chemical intermediates, insecticides, rubber accelerators, etc. Such products are crystalline solids which contain a relatively high proportion of combined sulfur but which are free from combined nitrogen. They are insoluble in hot and cold water, but are soluble in a variety of organic solvents, e. g., acetone, benzene, petroleum ether, etc. Their exact molecular structure is unknown, but it is postulated that they are tetrasulfides of the general formula:

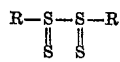

wherein each R represents a secondary alkyl or cycloalkyl group. Such structure, however, has not been conclusively established, and the new products are accordingly described and claimed herein as reaction products rather than as definite chemical compounds whose identity is only speculative.

The salts which are employed in preparing the reaction products of the present invention are alkali-metal or ammonium salts of secondary mono-nitro alkyl or cycloalkyl hydrocarbons which may be represented by one of the general formulae:

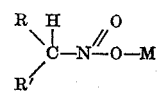

or

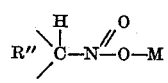

wherein R and R' each represents an alkyl radical and together contain from 2 to 8 carbon atoms, R'' represents a cyclic polymethylene chain containing from 3 to 7 carbon atoms, and M represents an alkali-metal or the ammonium radical. The term "secondary mono-nitro hydrocarbon" is employed to define the compounds as containing a single nitro substituent attached to a secondary carbon atom. Examples of such salts are sodium aci-2-nitropropane, potassium aci-nitrocyclobutane, ammonium aci-nitrodimethyl-cyclopentane, lithium aci-nitrocyclohexane, sodium aci-2-nitrohexane, potassium aci-2-nitro-3-methylbutane, ammonium aci-nitrotertiarybutylcyclohexane, sodium aci-2-nitro-iso-octane, sodium aci-nitrocyclo-octane, sodium aci-nitro-trimethylcyclohexane, potassium aci-3-nitroheptane, ammonium aci-2-nitro-3,5-dimethyloctane, ammonium aci-4-nitrodecane, potassium aci-nitro-di-isopropylcyclopentane, etc. The secondary mono-nitro-hydrocarbons corresponding to these salts are usually prepared by the nitration of the corresponding hydrocarbon according to known procedure, and the salts themselves are obtained simply by mixing the nitrocycloalkane or nitroalkane with an aqueous solution of ammonium or an alkali-metal hydroxide. Such salts take the form of water-soluble crystalline solids, and if desired may be isolated and employed in such form in practicing the present invention. Salts in which the hydrocarbon radical bears an inert substituent, e. g., a halogen or nitrile substituent, may also be employed.

The reaction between the above-defined salts and hydrogen sulfide to form the new products of the invention takes place at ordinary or moderately elevated temperatures, e. g. between about 10° C. and about 200° C., and is conveniently carried out in aqueous solution. Usually it is preferred simply to pass the hydrogen sulfide into an aqueous solution of the salt while maintaining a temperature between about 20° C. and the boiling point of the solution. When employing higher temperatures, it is necessary to operate under superatmospheric pressure, in which case the requisite amount of hydrogen sulfide may be pressured into a pressure vessel containing the aqueous salt. The vessel is then closed and is heated at the desired temperature until the reaction is complete as indicated by the pressure within the vessel dropping to a low fixed value. When the reaction is effected at atmospheric pressure at or below the reflux temperature of the aqueous salt solution by passing the hydrogen sulfide into the aqueous salt, completion of the reaction is indicated by the hydrogen sulfide no longer being absorbed in the liquid phase.

As stated above, the salt may be employed in purified crystalline form, in which case it is simply dissolved in water prior to being reacted with the hydrogen sulfide as previously described. Preferably, however, the salt is employed directly as it is obtained by reaction with an aqueous alkali-metal or ammonium hydroxide and the corresponding nitro-hydrocarbon. Accordingly, it is preferred simply to dissolve the nitro-hydrocarbon in an aqueous solution of the desired alkali-metal or ammonium hydroxide, and to treat directly the aqueous aci-nitro salt which is thereby formed with hydrogen sulfide as above described. When following such procedure, the alkali-metal or ammonium hydroxide is usually employed in excess, e. g., from about one to about five moles of the alkali per mole of the nitro-hydrocarbon. The hydrogen sulfide is employed in an amount representing between about four and about ten moles of hydrogen sulfide per mole of the salt.

Upon completion of the reaction, the reaction mixture separates into an aqueous phase and a subnatant organic phase comprising the desired product. If desired, the lower phase may be separated and subjected to fractional distillation in order to distill off any low-boiling products, whereby the desired reaction product is obtained in crude form as distillation bottoms. Usually, however, it is preferred to isolate the desired product in a more highly purified state in which case the organic layer of the reaction mixture is taken up in an organic solvent, e. g. acetone or benzene, and the resulting solution is cooled to allow the product to crystallize out. If a highly purified product is desired, it may be subjected to several recrystallizations.

The following examples will illustrate several ways in which the principle of the invention may be applied, but are not to be construed as limiting the invention. All proportions are given in parts by weight.

*Example I*

Approximately 129 parts of nitrocyclohexane and 2700 parts of aqueous ammonium hydroxide are placed in a 3-necked flask fitted with a reflux condenser, stirrer, and gas inlet tube. Hydrogen sulfide is passed into the flask through the gas inlet tube, which extends beneath the liquid surface, while maintaining the contents of the flask at a temperature between about 40° and about 55° C. Upon completion of the reaction, as indicated by the hydrogen sulfide no longer being absorbed in the liquid, the contents of the flask are transferred to a separatory funnel. Upon standing overnight, a colorless viscous semi-solid separates as a subnatant layer. This material is drawn off, and upon being allowed to stand for several days it solidifies to a colorless crystalline mass. After two recrystallizations from acetone, this product is obtained as a colorless crystalline solid having a melting point of 60°–61° C. It contains 42.6 per cent by weight of sulfur and no nitrogen. Upon treatment with strong alkalies, it forms a disulfide. It is postulated that this product is a dicyclohexyl tetrasulfide having the formula:

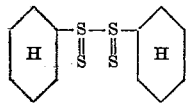

*Example II*

Approximately 10 parts of 2-nitropropane and 10 parts of sodium hydroxide dissolved in 200 parts of water are charged into a pressure vessel. Hydrogen sulfide in the amount of 25 parts is pumped into the vessel, and the vessel and contents are heated at a temperature of about 150° C. for about 3 hours. The vessel and contents are then cooled, the liquid product is withdrawn, and the latter is worked up as described in Example I whereby there is obtained a crystalline solid reaction product whose analysis indicates it to have the empirical formula $C_6H_{14}S_4$.

*Example III*

Approximately 166 parts of potassium aci-nitrodimethylcyclopentane are dissolved in 600 parts of water, and the resulting solution is treated with hydrogen sulfide as described in Example I. The crude product is separated from the aqueous phase and is crystallized from benzene solution to obtain a crystalline solid product whose analysis indicates it to have the empirical formula $C_{14}H_{26}S_4$.

Other modes of applying the principle of our invention may be employed instead of those explained, change being made as regards the materials or procedure employed provided the product stated by any of the following claims be obtained or the step or steps stated by any of the following claims be employed, or the equivalent of such stated products or steps, be obtained or employed.

We, therefore, particularly point out and distinctly claim as our invention:

1. Nitrogen-free sulfur-containing products obtained by reacting hydrogen sulfide with a compound selected from the class consisting of (1) salts having the general formula:

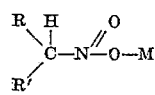

wherein R and R' each represents an alkyl radical and together contain a total of from 2 to 9 carbon atoms, and M represents a substituent selected from the class consisting of the alkali-metals and the ammonium radical, and (2) salts having the general formula:

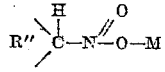

wherein R'' represents a cyclic polymethylene chain containing from 3 to 7 carbon atoms and M represents a substituent selected from the class consisting of the alkali-metals and the ammonium radical, the reaction being carried out at a reaction temperature below about 200° C.

2. Nitrogen-free sulfur-containing products obtained by reacting hydrogen sulfide with an aqueous solution of a compound having the general formula:

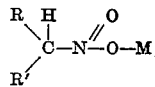

wherein R and R' each represents an alkyl radical and together contain a total of from 2 to 9 carbon atoms, and M represents a substituent selected from the class consisting of the alkali-metals and the ammonium radical, the reaction being carried out at a reaction temperature below about 200° C.

3. Nitrogen-free sulfur-containing products obtained by reacting hydrogen sulfide with an aqueous solution of a compound having the general formula:

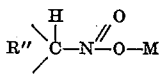

wherein R'' represents a cyclic polymethylene chain containing from 3 to 7 carbon atoms, and M represents a substituent selected from the class consisting of the alkali-metals and the ammonium radical at a reaction temperature below about 200° C.

4. A nitrogen-free sulfur-containing product obtained by reacting hydrogen sulfide with an aqueous solution of a compound selected from the class consisting of the alkali-metal and ammonium salts of nitrocyclohexane at a reaction temperature below about 200° C.

5. A nitrogen-free sulfur-containing product obtained by reacting hydrogen sulfide with an aqueous solution of a compound selected from the class consisting of the alkali-metal and ammonium salts of 2-nitropropane at a reaction temperature below about 200° C.

6. A nitrogen-free sulfur-containing product obtained by reacting hydrogen sulfide with an aqueous solution of a compound selected from the class consisting of the alkali-metal and ammonium salts of nitrodimethylcyclopentane at a reaction temperature below about 200° C.

7. The process which comprises forming an aqueous solution of a compound selected from the class consisting of (1) salts having the general formula:

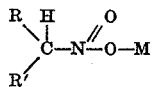

wherein R and R' each represents an alkyl radical and together contain a total of from 2 to 9 carbon atoms, and M represents a substituent selected from the class consisting of the alkali-metals and the ammonium radical, and (2) salts having the general formula:

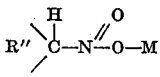

wherein R'' represents a cyclic polymethylene chain containing from 3 to 7 carbon atoms and M represents a substituent selected from the class consisting of the alkali-metals and the ammonium radical; and reacting said solution with gaseous hydrogen sulfide while maintaining a reaction temperature between about 10° C. and about 200° C.

8. The process which comprises dissolving a compound selected from the class consisting of secondary mono-nitro alkyl hydrocarbons containing from 3 to 10 carbon atoms and secondary mono-nitro cycloalkyl hydrocarbons containing from 4 to 8 hydrocarbons in an aqueous alkali selected from the class consisting of alkali-metal and ammonium hydroxides; and reacting the resulting solution with hydrogen sulfide while maintaining a reaction temperature between about 10° C. and about 200° C.

CLARENCE S. COE.
THOMAS F. DOUMANI.

No references cited.